United States Patent [19]
Lingle
[11] 4,224,731
[45] Sep. 30, 1980

[54] METHOD OF AND APPARATUS FOR APPLYING PRONGED SHEET METAL SPRING ANCHORING CLIPS TO FURNITURE RAILS

[75] Inventor: Harrison C. Lingle, Northbrook, Ill.

[73] Assignee: Hartco Company, Lincolnwood, Ill.

[21] Appl. No.: 942,877

[22] Filed: Sep. 15, 1978

[51] Int. Cl.[3] .......................... B23P 11/00; B27F 7/00

[52] U.S. Cl. .................................. 29/432; 29/243.56; 29/716; 29/798; 29/809; 227/7; 227/95

[58] Field of Search ........... 29/243.56, 243.57, 243.58, 29/709, 716, 810, 787, 798, 432, 429, 809; 227/5-7, 95; 414/130

[56] References Cited

U.S. PATENT DOCUMENTS

| | | | |
|---|---|---|---|
| 3,108,368 | 10/1963 | Steward | 29/798 X |
| 3,118,216 | 1/1964 | Richards et al. | 29/787 X |
| 3,391,517 | 7/1968 | Lentz | 28/810 X |
| 3,675,302 | 7/1972 | Dixon | 29/709 |
| 3,681,842 | 8/1972 | Blakeslee | 29/798 X |
| 3,717,924 | 2/1973 | Kennedy | 29/432 |
| 3,981,494 | 9/1976 | Prestgaard | 44/130 X |
| 4,059,889 | 11/1977 | Randolph et al. | 29/709 X |
| 4,073,423 | 2/1978 | Omley | 227/95 X |
| 4,135,378 | 1/1979 | Balon | 29/709 X |

*Primary Examiner*—Leon Gilden

[57] ABSTRACT

A cyclicly operable apparatus wherein an elongated supporting table receives a stack of wooden furniture rails thereon at one end thereof and a conveyor repeatedly impels the bottommost rail in the stack in one direction past a fixed clip-applying tool which receives clips from a magazine and applies them at predetermined locations along the rail. As the leading edge of the rail approaches the tool, it is sensed and, upon sensing thereof, electrical impulses are emitted and registered in a micro-processor which affords control means for stopping the conveyor and rail when predetermined numbers of impulses have been counted, actuating the clip-applying tool, feeding a clip from the magazine to the tool for the next clip application, and restarting the conveyor. A method of thus applying clips.

4 Claims, 11 Drawing Figures

FIG. 4
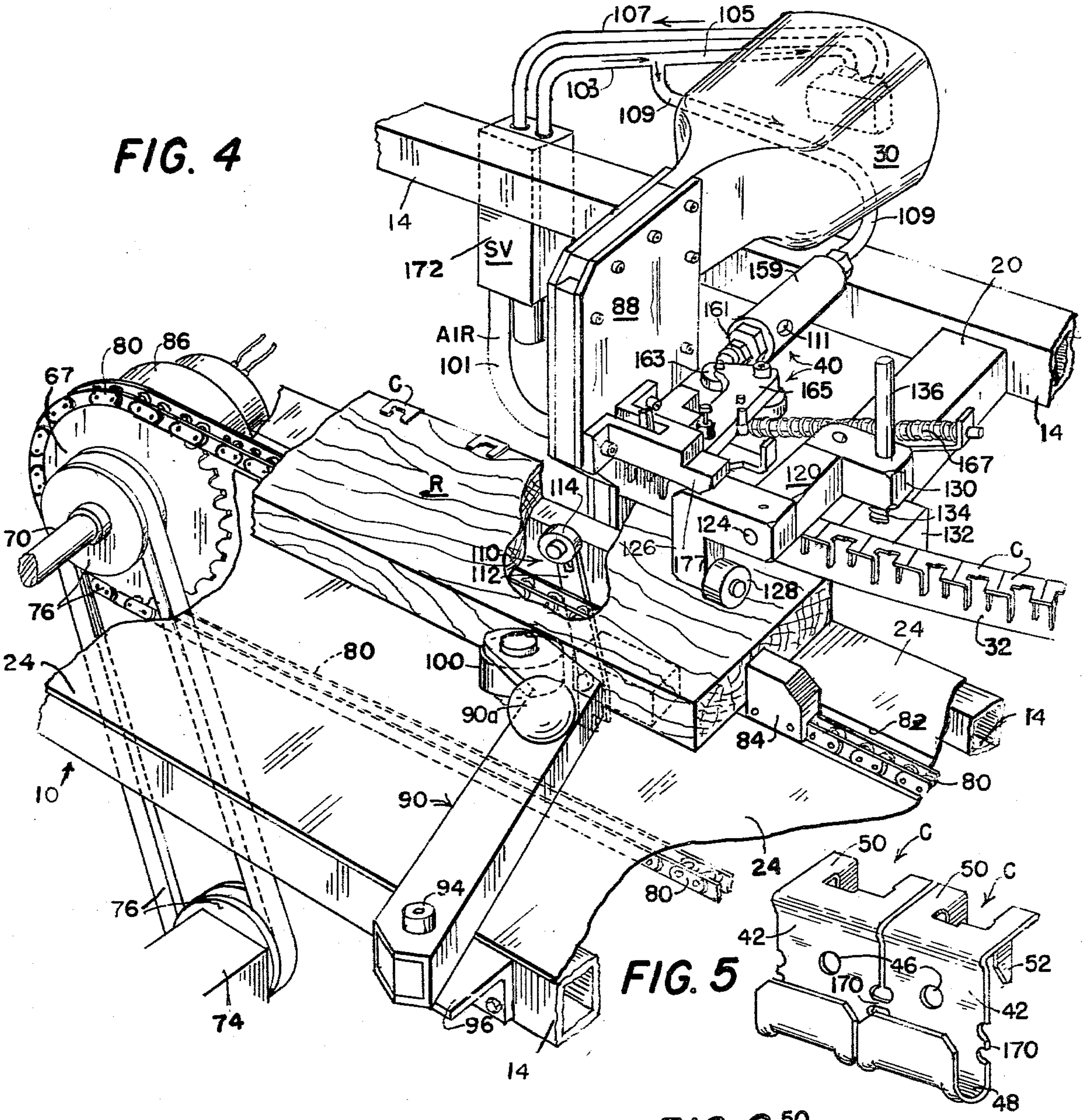
FIG. 5
FIG. 6
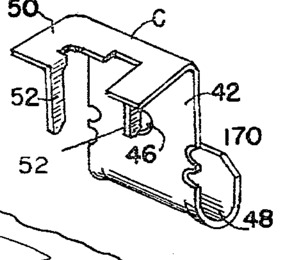
FIG. 7
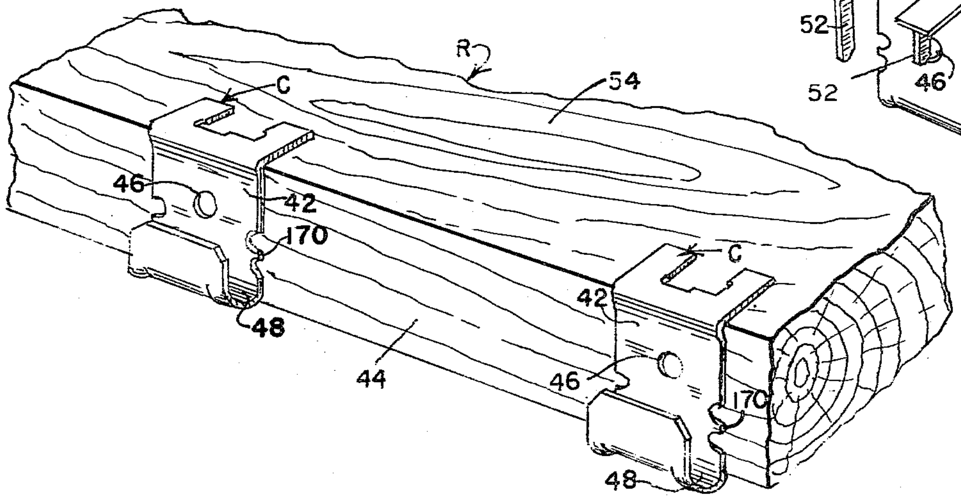

METHOD OF AND APPARATUS FOR APPLYING PRONGED SHEET METAL SPRING ANCHORING CLIPS TO FURNITURE RAILS

The present invention relates to furniture manufacture and has particular reference to a novel method of and an apparatus for applying pronged sheet metal spring-anchoring clips to wooden furniture rails preparatory to assembling the clip-equipped rails in an article of furniture. More specifically, the invention is concerned with a fully automatic apparatus by means of which such clips may be applied to the edge regions of successive rails at predetermined distances therealong in order to attain a desired spacing between adjacent clips, as well as to center the pattern of spaced clips equally from the ends of the rails or otherwise effect a desired medial placement of the spaced clip patterns on the rails.

Although the invention has been disclosed herein in connection with the application of pronged furniture clips of the general type shown and described in U.S. Pat. No. 4,102,586, granted on July 8, 1978, and entitled "Sheet Metal Fastener Clips for Wooden Furniture Rails," the invention may be found useful, by suitable modification as required, for the application of clips which, instead of employing prongs that are driven into the rail, are affixed to the rail by stapling, nailing or the like.

In the large scale production of furniture on a commercial basis, it has long been the practice to apply the clips to the individual rails on a workbench and then, after the clips have been properly applied, the rails are assembled to produce a rectangular furniture frame across which there is adapted to be stretched or otherwise placed a series of zigzag sinuous cushion supporting springs, the ends of which are anchored by pairs of opposed clips, the springs being highly resilient and arched so that they constitute a yielding support for the occupont. With some furniture frames, the clips may be equally spaced along the opposed rails but, with most such frames, variable spacing is resorted to. For example, stress requirements dictate that near the opposite ends of the opposed frame rails the first two or three clips be more closely spaced than are the clips which extend along the medial regions of the rails, these latter clips usually being equally spaced. The spacing of the clips along the rails will, of course, vary depending upon the length of the rails, as well as upon the desired spacing pattern.

Heretofore, where workbench operations have been resorted to, it has been customary to align four or eight rails in face-to-face contact, place the thus sidewise stacked rails on edge on the bench, and then measure and mark the distances across the edges of the stacked rails, utilizing a straight edge tool such as a ruler or the like. Theafter the rails are separated and the clips are manually applied to the individual rails at the thus marked locations. By such a procedure it is obvious that considerable care and attention is required by reason of the necessary manipulation of the rails which, where long rails are concerned, are relatively heavy, and also by reason of the accurate measurements which must be made and the accurate alignment of the clips to conform to such measurements.

Recently, the industry has made efforts to automatize, or at least simplify, the application of clips to furniture rails but, insofar as is known, complete automatization has not yet been attained. Such efforts have largely been associated with the application of clips which are applied to the rails by means of staples or nails. According to one known method, instead of manually placing the clips on the rails at the marked positions and then stapling or nailing them in position, clip-stapling tools have been developed which are power-actuated and into which the clips may be loaded, one at a time. After each clip has been positioned in the tool, the latter is aligned with the markings on the rail and, upon firing of the tool, a staple is driven through suitable openings in the clip to affix it in position on the rail. Such method however does not eliminate manual handling of the clips since, as stated above, it is necessary that they be manually inserted in the tool one at a time. It does however insure accurate driving of the staples through the openings provided for it in the clip and, moreover, by aiming the tool so that the nose thereof coincides with the markings on the rail, less frequent misapplication of a clip in an offset position takes place.

In an effort to further simplify the placement of clips of the non-pronged variety on furniture rails, a tool which is provided with both a clip magazine and a staple magazine has been designed as exemplified by U.S. Pat. No. 3,633,810, granted on Jan. 11, 1927 and entitled "Combined Stapler and Clipper for Furniture Spring Clips." Such tool is hand-held and requires aiming each time a clip is applied to a rail so that the danger of occasional misapplication of a clip is not alleviated, the improvement consisting merely in the elimination of individually handling a clip each time a clip application is made.

Still more recently, a form of semi-automatic clip-applying tool has been developed wherein the workbench is provided with a guideway along which the rail (which invariably is in the form of an elongated wooden board) may be manually slid endwise so that it moves through a clip-applying station where it passes beneath a clip-applying tool that feeds the clips from a clip magazine. Positioned on the bench in the vicinity of the tool there is disposed an elongated measuring strip having magnetized spots or areas therealong which are spaced commensurately with the desired pattern of clip spacing. Disposed in the path of travel of the rail is a proximity switch device which, after engaging the leading edge of the rail, travels with the rail and, as it passes each magnetized spot or area, causes the clip-applying tool to apply a clip to the rail at the proper location therealong. The clips are of the pronged variety so that each time the tool is energized a clip is "fired" into the rail so that the prongs are pressed into the wood. Since the rail is advanced along the guideway by light manual force, firing of the clip into the rail will terminate the forward motion of the latter and, as soon as the clip has been applied and the pressure of the clip-applying tool relieved, forward motion of the rail will be resumed under the influence of the continuously applied manual force. After the last clip has been driven into the rail, the latter is manually removed from the workbench and a succeeding rail is lifted into position within the guideway.

Such semi-automatic procedure eliminates some of the manual steps that heretofore had been required for pronged clip application but, nevertheless it entails a certain amount of manual dexterity in that an operator is required to be in constant attendance alongside the workbench for the purpose of manually forcing the rails in a forward direction toward the clip-applying station and then through such station intermittently until all of the clips have been applied. Such manual attention and handling must be given to each rail of any given run of similar rails including the lifting of the rails individually onto the table guideway and the removal of the rails after they have been treated. Furthermore, when it is desired to change from a given run of rails to a different run involving rails of a different length, or rails having different patterns of clip placement, the changeover requires the use of a different magnetized measuring strip. Ordinarily this requires that the furniture manufacturer maintain a large inventory of differently magnetized and different length measuring strips, as well as requiring him to be prepared to construct and install strips that will accommodate special length rails, or rails that require special clip placement patterns.

The present invention is designed to overcome the above-noted limitations that are attendant upon the commercial application of clips to furniture rails, and particularly to eliminate the manual operations that accompany such clip application. Toward this end, the invention contemplates the provision of a fully automatic apparatus or machine wherein the only manual operation that is required resides in the stacking of the wooden boards in superimposed relationship at a stacking station, after which, when the apparatus is set into operation, the rails are automatically withdrawn, one at a time, from the stack and fed endwise to and through a clip-applying station where the clips are applied successively to the rail at precisely the desired locations therealong by means of a fixedly positioned clip-applying tool. After the last clip has been appplied to each rail, the latter is conducted from the apparatus to a region of discharge. One of the principal features of the present invention resides in the provision of a rail-handling and clip-applying apparatus which is capable of performing the functions set forth above under the control of a micro-processor which may be preset for any given run of rails through the apparatus. Such micro-processor is capable of accommodating rails of any given length, as well as accommodating any desired pattern of clip placements on the rail. By such an arrangement of apparatus, operating under the control of a micro-processor, substantially no manual operations are involved during the application of clips to all of the rails of any given run. As will become apparent when the nature of the invention is better understood, very little attention to the apparatus is required in order to convert the same to a different character of run where the rails employ a different clip placement pattern. The differing placement pattern may be effected without making any adjustments whatsoever to the apparatus which continues to advance the rails, regardless of their length, through the clip-applying station for reception of clips thereon according to the new placement pattern. The change of clip spacing along the rails is taken care of by programming the apparatus under the dictates of the micro-processor with the new program being set into the latter by the simple expedient of finger-adjusting the settings of a few digital selector switches which are conveniently accessible on the panel of the micro-processor.

Briefly, in carrying out the invention, a table-like support or framework is provided which establishes a guideway for endwise travel of the wooden rails to which the clips are to be applied. The table also establishes a rail stacking station adjacent one end of the guideway, while a conveyor which preferably, but not necessarily, is of the endless chain and sprocket type, is adapted to withdraw successive rails from the rail stacking station and conduct them endwise to the clip-applying station under the influence of an electric motor which is drivingly connected to the conveyor. An impulse-emitting device, the operation of which is correlated with the motion of the conveyor, is adapted to emit impulses over any given span of conveyor motion, such emitting device thus, in effect, measuring the distance traveled by the rail undergoing transportation by the conveyor. A sensing device is disposed in the path of movement of the rails as they progress toward the clip-applying station and, upon sensing the leading edge each rail, a signal is transmitted to the micro-processor and, at this time, the number of emitted impulses are effectively registered or "counted."

Each emitted impulses represents an increment of forward rail travel, the quantity of counted impulses is a representation of the distance traveled by a rail. The micro-processor (which will hereinafter on occasions be referred to simply as the computer) controls the operation of the clip-applying apparatus according to the input information which is entered therein through the medium of the aforementioned digital input switches and which relates, in the main, to the desired pattern of clip spacing along the rail. Upon sensing of the leading edge of each rail, and after the required number of impulses that represent the distance from such leading edge and the point at which the first clip is to be applied has been emitted and counted, the computer terminates the forward motion of the rail and causes the clip-applying tool to fire a clip and thus apply it to the rail at the selected distance from the leading edge. Allowing a short period of time for full and proper operation of the clip-applying tool, a fresh clip is fed from the clip magazine to the tool and, during this time, the rail advances through the clip-applying station while further impulses are emitted and counted until the number of impulses that represent the distance between the first applied clip and the point at which the second clip is to be applied have been counted. The computer then again causes the apparatus to momentarily terminate the forward movement of the rail, to fire the tool and thus apply the second clip, and to feed the third clip to the tool. The process is repeated until the last clip has been applied to the rail.

It will be understood that any desired pattern of clip spacing along the rails may be effected by the simple expedient of setting the desired mode of operation of the apparatus into the micro-processor through the medium of the digital selector switches which are provided for this purpose. No adjustments whatsoever are required of the rail-handling and clip-applying apparatus which remains untouched and which is capable of effecting a wide variety of clip placements according to the information which is fed into the computer prior to commencement of any given run of rails. At the risk of repetition, it is to be borne in mind that ordinarily the digital selector switches of the micro-processor or computer wll initially be set before any given run to accommodate a close spacing between the first two or three clips which are applied to the leading end region of each rail, and also between the clips last two or three clips which are to be applied to the trailing end region of each rail, while a somewhat wider spacing is applied to the medially arranged clips. The apparatus is capable of handling rails of varying length within a predetermined average length range without requiring adjustment, the conveyor having impelling lugs thereon which withdraw successive rails from the stack and conduct them to the clip-applying station. When the rails are of such length as to exceed this length range, removal of a conveyor lug and readjustment of the remaining lugs will condition the apparatus for handling such rails. If the rails are so short that they do not fall within the length span of average rails, one or more lugs may be added to the conveyor. Otherwise the apparatus is entirely computer controlled.

The provision of a clip-applying tool such as has briefly been outlined above and possessing the stated advantages, constitutes the principal object of the invention. Various other objects and advantages, not at this time enumerated, will become readily apparent as the nature of the invention is better understood.

In the accompanying drawings forming a part of this specification, one exemplary form of the invention has been shown.

In these drawings:

FIG. 4 is a fragmentary enlarged perspective view of a portion of the apparatus shown in FIG. 1, the view being taken in the vicinity of the clip-feeding and the clip-applying station;

FIG. 5 is a front perspective view of a pair of the furniture clips detached from the string of magazine-fed clips;

FIG. 6 is a rear view of the structure shown in FIG. 5;

FIG. 7 is a fragmentary prespective view of the edge region of one of the rails and showing the manner in which the clips are prong-pressed thereinto;

Figures 1, 2, 3:
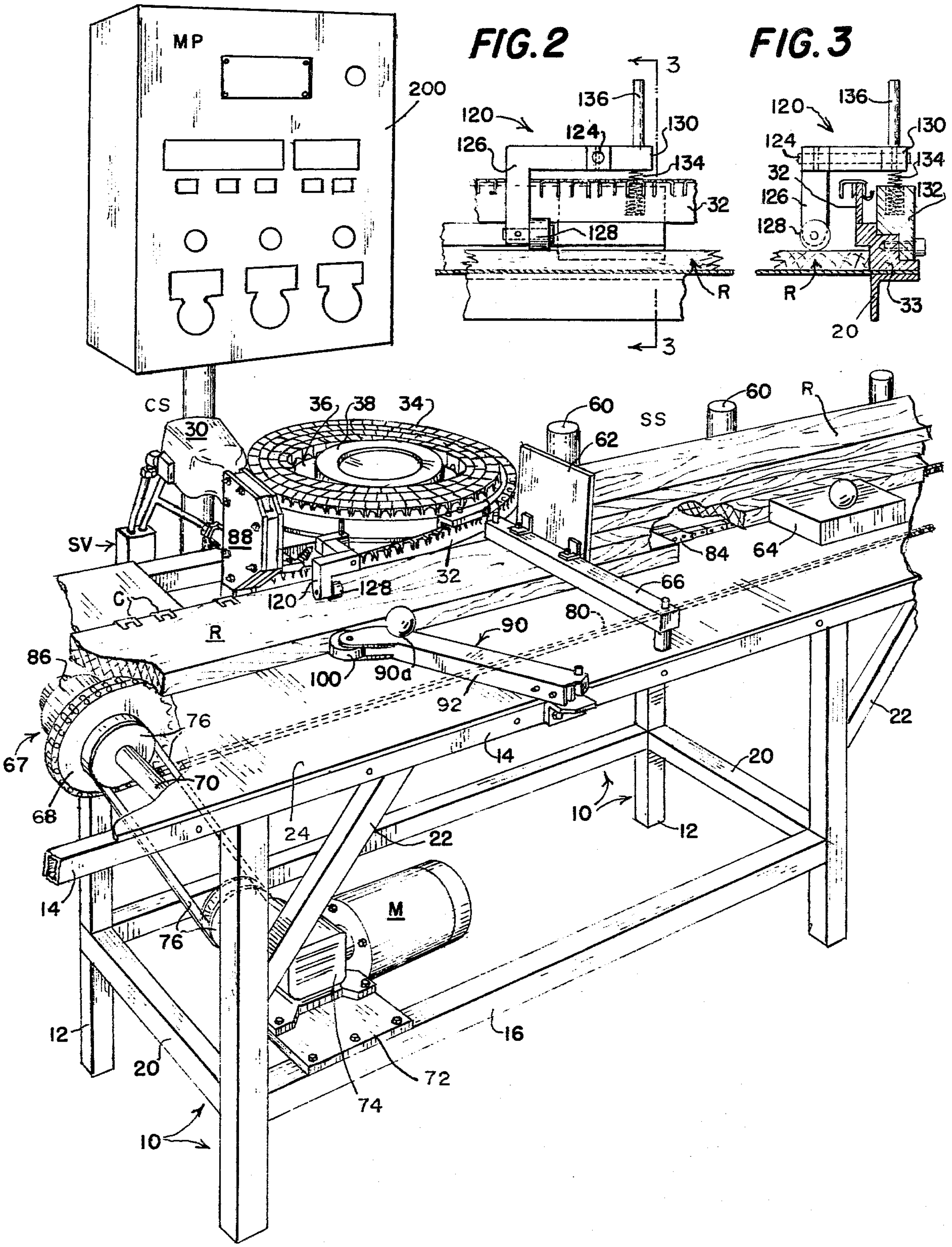
FIG. 1 is a fragmentary side perspective view of a clip-applying apparatus constructed in accordance with the principles of the present invention and showing the same operatively engaged in applying spring anchoring clips to successive furniture rails which have been loaded into the apparatus.
FIG. 2 is an enlarged sectional view taken substantially on the line 2—2 of FIG. 1 and illustrating the nature of a rail hold-down mechanism employed in connection with the invention.
FIG. 3 is a sectional view taken substantially on the line 3—3 of FIG. 2.

Referring now to the drawings in detail, and in particular to FIGS. 1 and 4, the clip-applying mechanism of the present invention, in the exemplary form selected for disclosure herein, involves in its general organization a table-like structure of elongated design and including an open framework 10 embodying a plurality of vertical supporting members or legs 12, upper and lower longitudinally extending members 14 and 16 respectively, and upper and lower transversely extending members 18 and 20 respectively. Inclined braces or struts 22 may be employed throughout the framework 10 at appropriate places.

A divided sheet metal plate 24 extends between the two front upper frame members 14 and establishes a table surface along which the wooden furniture rails R are adapted to be impelled in a longitudinal direction from a stacking station SS where a plurality of wooden furniture rails are stacked vertically upon one another, through a clip-applying station CS where a suitable pneumatic tool 30 operates, when energized, to apply furniture clips of the general type shown in FIGS. 5 and 6 and indicated at C successively to the rails R passing through the clip-applying station.

Figure 8:
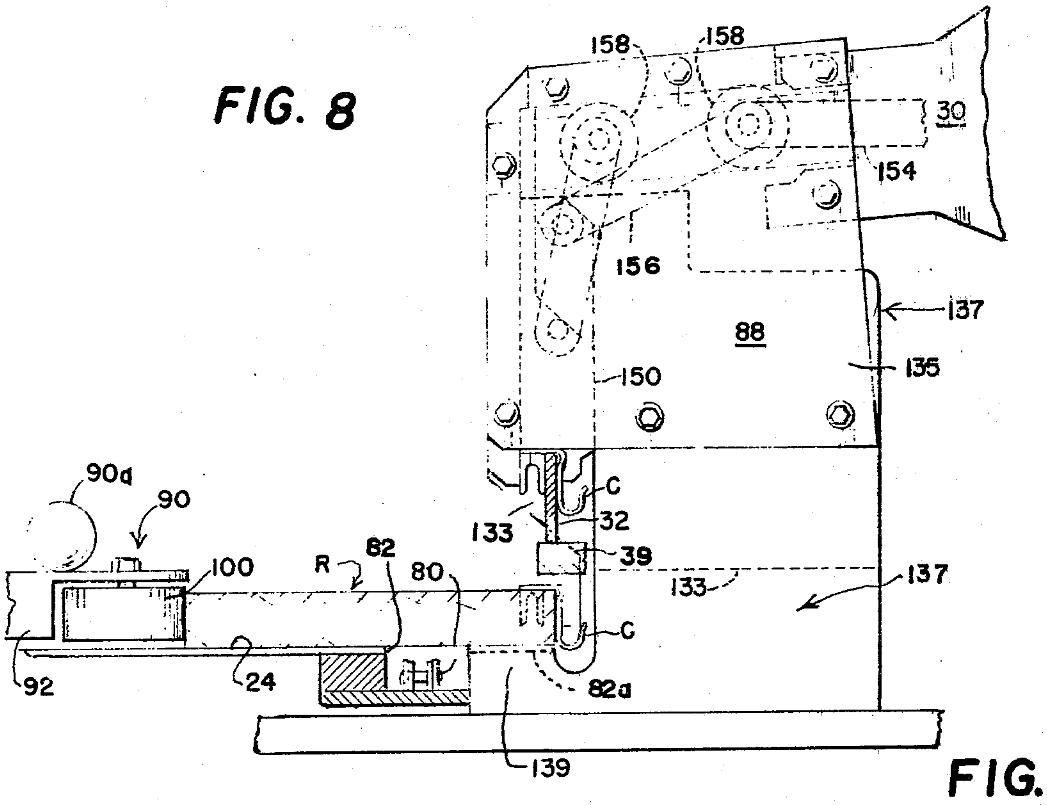
FIG. 8 is a side elevational view, partly in section, of the clip-applying tool and its associated clip-driving head, showing its relation to a clip carrying magazine, the view being taken on the longitudinally offset vertical planes indicated by the line 8—8 of FIG. 4 with certain parts being omitted in the interests of clarity.

The clips C are fed to the tool 30 on a curved magazine rail 32 which, in turn, receives the clips from a clip source in the form of a coiled string 34 (FIG. 1) which may be supported on a conveniently positioned freely rotable dispensing disk 36 having a central pilot hub 38 for the coiled string of clips. The magazine rail 32 is carried on a support 39 (FIG. 8). A clip-feeding mechanism which is designated in its entirety at 40 and the details of which are best shown in FIG. 4 is disposed in the vicinity of the tool 30 and functions to advance the clips, one at a time, along the magazine rail 32 toward the tool 30 and thus introduce the leading clip in the string 34 between the tool head and the rail undergoing treatment.

Before entering into a detailed discussion of the manner in which the rails are maintained in the stacking station, the manner in which they are guided and impelled along the table 24, the manner in which the clips are struck from the magazine rail 32 by the clip applying tool 30, and the manner in which the clips are fed forwardly along the magazine rail and projected, one at a time, into the clip-applying station CS, it is believed that an understanding of the nature of the clips and the manner in which they cooperate with the rails will facilitate an understanding of the discussion. Accordingly, with reference to FIGS. 5, 6 and 7, the clip is of the general type shown and described in the aforementioned patent No. 4,102,586 and for a full understanding thereof reference may be had to such patent, the entire disclosure of which is hereby incorporated in and made a part of the present application insofar as it is consistent therewith. For purposes of description herein it is deemed sufficient to state that each clip includes a flat vertical base portion 42 which bears against one longitudinal edge 44 of the rail as shown in FIG. 7. The base portion 42 is formed with a central hole 46 therethrough, the function of which will be set forth presently. The lower edge of the base portion is formed with a curved reentrant bend which establishes a hook portion 48 for reception therein of the end portion of the usual zigzag cushion supporting spring of the article of furniture within which the rail is ultimately assembled. The upper edge of the base portion 42 is provided with a laterally turned flange 50 from which there projects a pair of clip-anchoring prongs 52 which, upon application of the clip to the upwardly facing flat side 54 of the rail are adapted to be pressed or forced downwardly so that they penetrate the wooden rail and cause the flange 50 to lie or seat upon such flat side. It will be understood that the horizintal position of the rail undergoing clip-application does not conform to the orientation of the rail when it is installed in the article of furniture. The rail, when installed, is turned through an angle of 90° so that the narrow vertical edge 44 lies in a horizontal plane and constitutes the top edge of the rail, while the flange 50 of the clip, in effect becomes a downturned leg from which the prongs project horizontally and extend into the outer side face of the rail R. Such a clip and rail orientation is illustrated in FIGS. 2, 3 and 4 of a copending application, Ser. No. 904,746, filed May 11, 1978 and entitled "Sheet Metal Fastener Assembly and Method of Forming the Same."

As shown in FIG. 8, the prongs 52 of each clip C project downwardly from the flange 50 and alongside the base of the clip in spaced relationship therefrom, thus enabling the string of clips to be slidably disposed in saddle-like fashion on the magazine rail 32 with the prongs 52 and base 42 straddling the rail 32 and the flange 50 of the clip resting upon the upper edge of the rail.

Referring again to FIG. 1, the side of the apparatus which faces the observer may be regarded as the forward side, while the side which carries the clip-applying tool and the clip coil 30 is regarded as the back side. Ordinarily an operator will, when required, be stationed along the forward side of the apparatus. The right hand end of the apparatus as seen in this view may be regarded as the rear end and the rails are adapted to travel from the stack of rails near such rear end forwardly toward and through the clip-applying station which is disposed near the front end of the apparatus. The terms "forward" and "back" as applied to the sides of the apparatus, and the terms "front" and "rear" as applied to the ends of the apparatus are thus distinguished herein in the interests of clarity when construing the invention, both in the specification and claims.

A series of aligned posts 60 extend along the back side of the apparatus near the rear end thereof and, in combination with an upstanding combined stacking and gate plate 62 which is slightly elevated from the divided plate of table surface 24, and also with one or more manually shiftable magnetized edge guides 64 as well as with the table surface itself, establish a variable dimension stacking bin for the rails R. The posts 60 and magnetized edge guides 64 also establish a variable width guideway along which the bottommost rail R in the stock may be slid forwardly beneath the gate plate 62 and conducted to the clip-applying station CS. The plate 62 is carried on a transversely extending stack-arresting bar 66 which is spaced above the table 24 a distance slightly greater than the thickness of a rail.

The board- or rail-impelling mechanism is in the form of an endless chain type conveyor 67 including a front conveyor drive sprocket 68 which is fixedly mounted on a rotable shaft 70 adjacent the front end of the framework 10, and an idler sprocket (not shown) carried near the rear end of the framework. The shaft 70, and consequently the sprocket 68, is adapted to be intermittently driven under the motivating influence of an electric motor M which is continuously rotatable and which is mounted on a platform 72 affixed to the lower frame member 16 and which operates through a substantially conjointly acting brake and clutch mechanism or unit 74. The unit 74 is operatively connected to the drive shaft 70 by means of a belt and pulley arrangement 76. A conveyor chain 80 extends between the driving and idler sprockets and has its upper reach disposed a slight distance beneath the level of the lowermost rail in the stack, such reach traveling within a longitudinal slot 82 (see FIG. 4) which is provided in the table surface 24. A plurality of rail picker elements or lugs 84 (FIG. 4) are removably mounted on the chain 80 and, as they travel forwardly on the upper reach of the chain, they project through the slot 82 and are adapted to engage the rear end edge of the lowermost rail R in the stack of rails and impel the same forwardly along the table 24, the rail passing beneath the stacking or gate plate 62. After the trailing edge of the rail R and its motivating lug have passed the longitudinal mid-plane of the stack of rails, the stack will become unbalanced so that the rear edge of the stack will fall by gravity and rest upon the table 24 and maintain a slight inclination of the stack until such time as the bottommost board undergoing foward impelling has cleared the forward end of the stack, at which time the stack will come to rest squarely by gravity on the table. It will be understood of course that the plate 62 functions to maintain the stack of rails intact within the stacking bin or area during rail-impelling operations so that the stack as a whole will be restrained from slifting bodily forwardly along the table.

As best shown in FIGS. 1 and 4, an impulse-emitting encoder 86 is mounted on or suitably coupled to the shaft 70 in driven relationship and it functions to emit electrical impulses which are forwarded to a microprocessor MP (FIGS. 1 and 10) which may be programmed to control the operation of the clip-applying apparatus for applying clips to the rails at predetermined spaced positions therealong.

Referring now to FIGS. 1 and 4, the aforementioned posts 60, in combination with the placement magnets 64 constitute edge guides which direct the boards or rails R in an accurate longitudinal axial path as they emerge from the stacking bin. As the leading edge regions of the rails approach the clip-applying station CS, the rails are confined between a clip driving tool head 88 which is associated with the tool 30 and a rail-biasing device 90 which opposes the tool on the forward side of the path of the rail, all in a manner that will be made clear presently. The rails are thus constrained to move endwise in a linear straight path from which they do not deviate at any time and, moreover, the adjacent edges of such rails are pressed hard against the head 88 of the clip-applying tool 30 for accurate placement of each clip as it is driven into the rail.

Referring now to FIGS. 1, 4, 8 and 9, the aforementioned rail biasing device 90 is in the form of a hollow tubular swinging spring biased arm 92 (see particularly FIG. 9), the proximate end of which is pivoted by a stud 94 for horizontal swinging movement of the arm over the table surface 24 on a bracket 96. The distal end region of the arm 92 carries a roller 100 which is designed for tractional engagement with the forward side edge of the rail as the latter passes through the clip-applying station CS to yieldingly urge the back edge of such rail into firm engagement with the aforementioned guide posts 60, as well as with a downward enxtension on the tool head 88 for maintaining the rail properly positioned at the clip-applying station.

Figure 9:
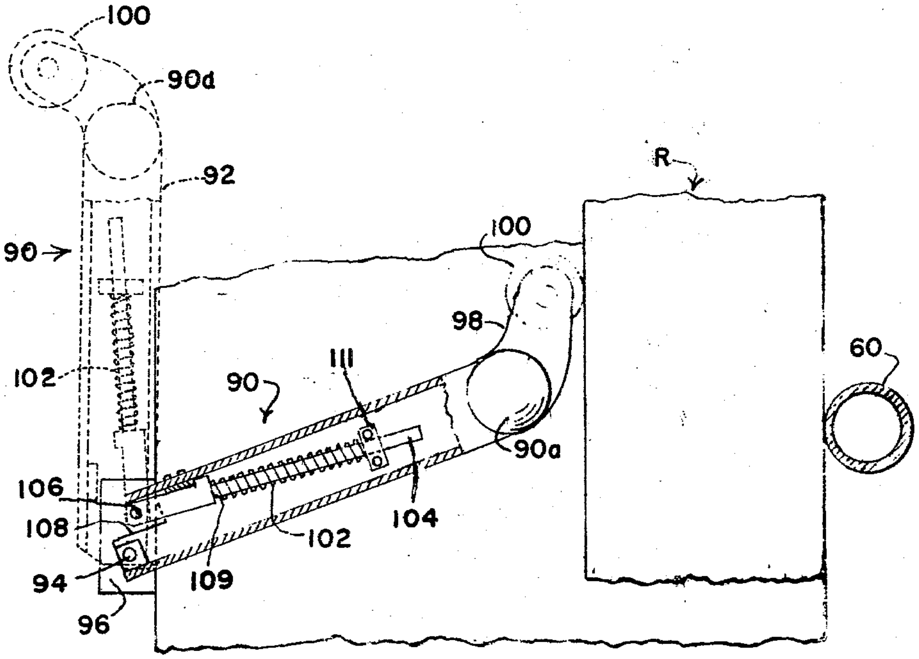
FIG. 9 is a top plan view of a portion of the structure shown in FIG. 4, the view being taken in the vicinity of a pivoted, spring-biased rail-engaging edge guide member which is employed in connection with the invention.

An over-center biasing mechanism within the arm 92 is provided for selectively biasing the arm either in a clockwise direction as viewed in FIG. 9 wherein the arm is effective against the rail, or in a counterclockwise direction to maintain the arm in its retracted dotted line position. Such selective biasing means embodies a compression spring 102 carried on a rod 104 the outer end of which is pivoted to the bracket 96 by means of a pin 106 which projects through a cutaway notch 108 in the arm 92. The spring 102 is compressed between a shoulder 109 on the rod 104 and a guide bracket 111 through which the distal end region of the rod 104 is slidable. A ball-like handle 90*a* near the outer end of the arm 92 is provided for swinging the arm between its advanced effective position and its inoperative out-of-the way retracted position. The arm 92 is capable of swinging movement bodily so that it may assume positions on either side of a line passing through the two pivot points afforded by the pins 94 and 106, thus establishing the aforementioned over-center biasing effect of the spring 102 on the arm 92.

Figure 10:
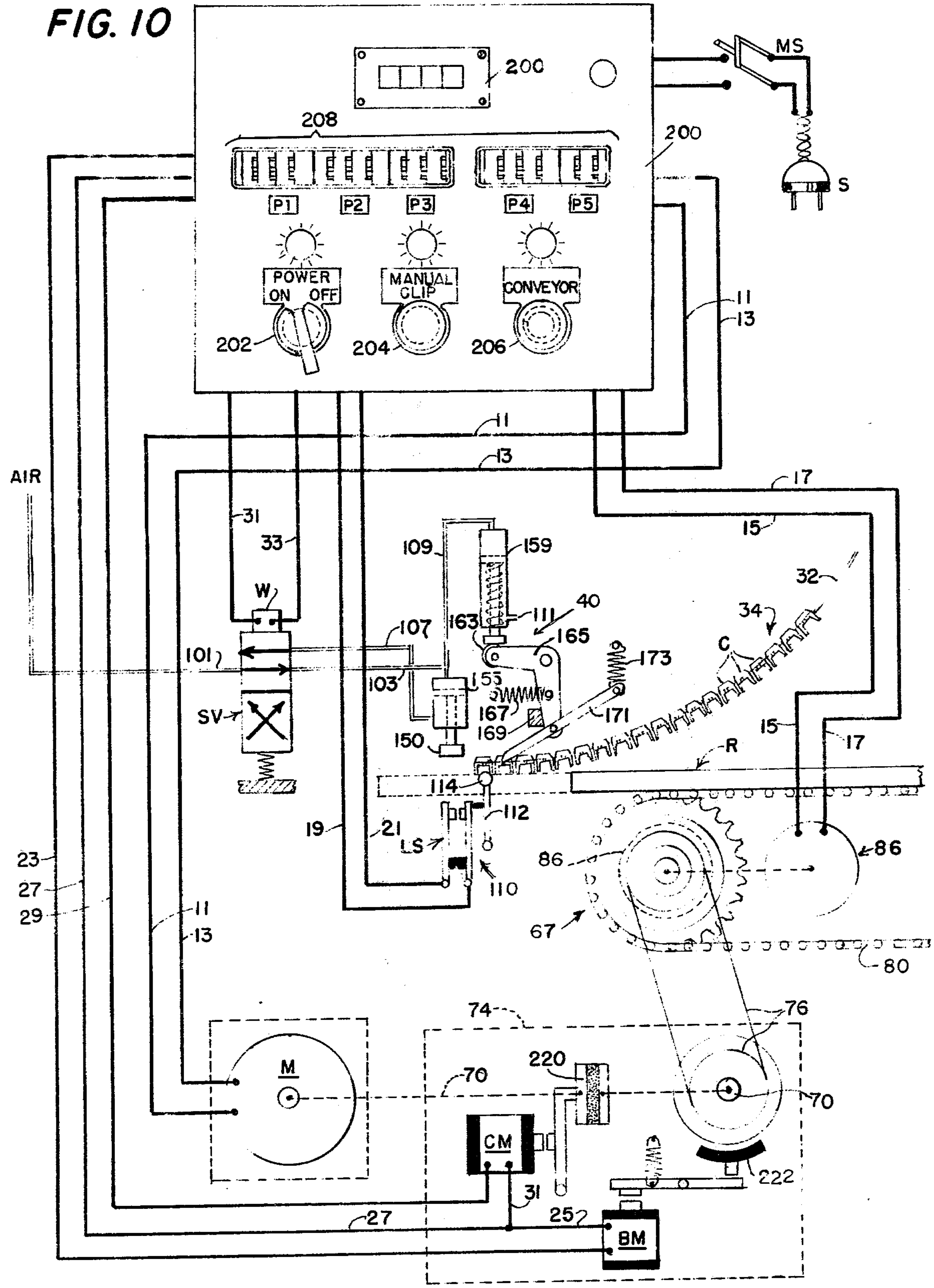
FIG. 10 is a combined pneumatic and electric circuit diagram, entirely schematic in its representation, illustrating the salient components of the apparatus, the manner in which they cooperate with one another, and the manner in which they are computer controlled.

As show in FIGS. 4 and 10, a rail-sensing device 110 which, in the exemplary form of the invention illustrated herein, is comprised of a rail-engaging arm 112 having a roller 114 thereon, is adapted to close a pair of normally open contacts associated with a limit switch LS. The device 110 is disposed in the vicinity of the clip-applying tool 30 and, upon closure of such contacts, certain electrical functions are initiated which result in mechanical functions of the clip-applying apparatus, all in a manner that will be made clear when the operation of the apparatus is set forth.

As best shown in FIGS. 2, 3 and 4, a rail hold-down device 120 is affixed to the back rail 14 and is in the form of a generally Z-shaped member which is mounted for limited rocking movement on a horizontal rock shaft 124. A downwardly extending leg 126 carries a rail-engaging roller 128 while a lateral leg 130 overlies a reaction member 132 and a compression spring 134 which is interposed between the member 132 and leg 130 serves to yieldingly bias the roller 128 into hold-down engagement with the rail R passing therebeneath. An upstanding manipulating rod 136 on the leg 130 permits release of the roller when desired. It is to be noted at this point that the axis of the roller extends longitudinally of the rail R so that the roller engages the rail transversely and reduces the frictional retardation of the rail as it is urged toward the tool head 88 under the influence of the previously described rail-biasing arm 92.

The clip-applying tool 30 is a pneumatically operable tool and it operates generally in the manner of the tool which is shown and describes in U.S. Pat. No. 3,631,656, granted on Feb. 15, 1972 and entitled "Clip-applying and Clinching Tools," although it differs somewhat therefrom in its physical aspects and particularly in its functional aspects. Whereas the patented tool is a hand-held tool which clinches sheet metal clips for affixing two or more wires together, the air cylinder and the power transmission of the tool head 88 are substantially the same as the air cylinder and power transmission of the patented structure. For a full understanding of the power transmission of the present tool head 88, reference may be had to such patent but, in the interests of a unified description, a dotted line disclosure of a schematic nature has been illustrated in FIG. 8.

As shown in FIG. 8, the tool head 88 embodies side plates 133 and 135 bolted to a supporting member 137 which supports the head and between which side plates the power transmission is disposed. Such power transmission includes a clip-engaging driver or ram 150, the vertical motion of which is translated from the horizontal movements of a piston rod 154 that is associated with the cylinder proper 155 (FIG. 10) by means of a toggle 156 which, in combination with the driver itself, establishes a toggle joint. The forward end of the link is pivotally connected to the upper end of the clip driver 150 while the rear end thereof is pivoted to the piston rod 154. As explained in considerable detail in the aforementioned U.S. Pat. No. 3,461,656, a roller 158 at the pivot point between the rod 154 and the link 156 cooperates with the underneath side of the top wall of the transmission section in reducing the heavy frictional forces which otherwise would be developed as the elbow joint "straightens out" so to speak during motion of the link 156 toward its verticai position. It will be understood that as the driver 150 approaches the limit of its downward clip-engaging stroke, a powerful thrust is applied to the clip undergoing application to the rail by means of such toggle linkage which forces the clip prongs securely into the rail.

In order to assimilate the downward thrust which is applied to the rail by the driver 150 at the time a clip is applied, a reaction anvil 139 (FIG. 8) is formed on the head-supporting member 137 and projects through a lateral slot extension 82*a* of the slot 82 and bears against the rail R at table level directly beneath the driver 150.

The aforementioned clip-feeding mechanism which feeds the clips C to the tool head 88 is best illustrated in FIG. 4 which, in conjunction with reference to the schematic disclosure of FIG. 10, will lead to a complete understanding of its nature and operation. The mechanism 40 is disposed in the vicinity of the tool head and it embodies an air cylinder 159 having a plunger 161 which is engageable with a roller 163 carried at the outer end of one leg of a bell crank lever 165. The other end of the bell crank lever 165 is biased in a clockwise direction as seen in this view by a spring 167 against a stop 169. The outer end of the other leg carries a pivoted clip-advancing pawl 171 which is biased in a counterclockwise direction by a spring 173. The pawl 171 is designed for cooperation with the various holes 46 (FIG. 5) in the clips C for advancing the latter successively, one at a time, forwardly along the magazine rail 32 and into clip driving position beneath the clip driver 150 at the clip-applying station CS. The extent of swinging movement of the bell crank lever 165 is such that during each projection of the driver 150, the pawl 171 leaves the hole 46 in one clip and enters the hole in the next preceding clip. Upon retraction of the driver 150, the spring 157 causes the pawl 171 to be advanced, thus projecting the leading clip C in the string of clips beneath the driver 150 for subsequent shearing from the string during the next succeeding clip-applying operation.

A spring-biased holding pawl 175 (FIG. 4) pivotally carried in a fixture 177 bolted to the tool head 88 cooperates with the trailing edge of the new leading clip in the string and prevents the pawl 171 from reversing the movement of the clips on the magazine rail 32, the adjacent clips in the string being separated by webs 179 which appear in FIGS. 5 and 7 and which are described in a copending application, Ser. No. 904,746, filed on Mar. 30, 1978 and entitled "Sheet Metal Fastener Assembly and Method of Forming the Same." The central holes 46 (FIG. 5) in the clips afford entrance voids for the pawl 171.

As shown in FIGS. 1 and 4, and also in the schematic representation of FIG. 10, the cylinder section of the pneumatic clip-applying tool 30 communicates by suitable air lines with an actuating solenoid valve SV having a solenoid winding w. The solenoid valve SV is operatively mounted on the aforementioned back frame rail 14 and is enclosed within a suitable housing 172.

The dual function of the valve SV is to supply air to the clip-applying tool 30, as well as to the clip feeding mechanism at the required times.

As previously stated in the introductory portion of this specification, the operation of the clip-applying apparatus is adapted to be controlled by a suitable micro-processor unit in conjunction with the encoder 86. Such a micro-processor is designated by the reference letters MP, the unit being carried on a post 174 suitably carried by the apparatus framework. The functioning of the unit MP will be described in considerable detail presently but an understanding of such detailed description will be greatly facilitated by first rendering a brief summary of the operation of the clip-applying apparatus per se in handling the rails R, i.e. causing them to be withdrawn from the rail stack at the stacking station, as well as in feeding the clips to the tool 30 from the magazine rail, one at a time, and in shearing the leading clips from the string of clips and driving them into the rails.

Accordingly, and with reference to FIGS. 1 and 10, but disregarding the micro-processor MP, the encoder 86, the sensing device 110, and all of the electrical controls associated with the apparatus, and assuming that in their place suitable manually operable switches or other controls are provided for starting and stopping the conveyor 67 and actuating the clip-applying tool 30 and the clip feeding mechanism 40, initial movement of the conveyor will cause an oncoming conveyor lug 84 to encounter the rear edge of the bottommost rail R withdraw it from the stack of rails and impel it forwardly toward the tool 30 at the clip-applying station and past the clip driver 150 (FIG. 8) the necessary distance to compensate for the spacing of the first clip to be applied from the leading edge of the rail. At this time the conveyor is momentarily stopped by applying the brake 222 and releasing the clutch 220 associated with the unit 74 so that the rail momentarily pauses and assumes a brief period of dwell while the leading clip which overhangs the magazine rail 32 is sheared from the string of clips and its prongs 52 are driven into the rail R at the proper point. This shearing of the clip is accomplished by actuating the tool 30 so that the driver 150 moves downwardly and displaces the clip, thus rupturing the web 170 (FIG. 5) by means of which the clip is connected to the next succeeding clip on the magazine rail 32. In order to position a fresh clip beneath the driver 150 for the next clip-applying operation, the clip-feeding mechanism 40 is actuated and functions in the manner previously described to cause the pawl 171 (FIG. 10) to be withdrawn from the hole 46 in a clip on the magazine rail 32 and enter the hole in the next succeeding clip and then shift the string of clips forwardly one step so as to project the first clip into position beneath the driver 150. As soon as the first leading clip has been applied to the then stationary rail, the conveyor 67 and its associated rail are caused to resume their forward motion by releasing the brake 222 and engaging the clutch 220. This operation is repeated until the last clip has been applied.

Figure 11:
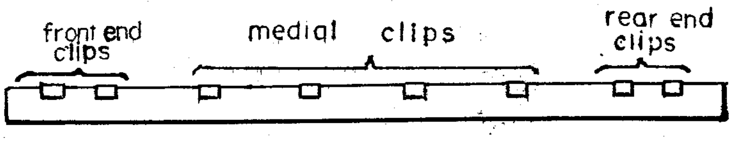
FIG. 11 is aa schematic edge view of a rail, illustrating a more or less comventional pattern of clips on a furniture rail.

The foregoing brief description of the manner in which the apparatus per se operates has been rendered with no consideration of the specific clip spacings along the rail. Where variable distance clip spacings such as are shown in FIG. 11 are required, the use of the micro-processor MP greatly facilitates the application of the clips by eliminating practically all manual attention to the apparatus.

Considering now the operation of the apparatus in association with the micro-processor, the encoder and the sensing device, the internal solid state electronic circuitry and the mechanical components involved in connection with the micro-processor have not been illustrated herein, it being deemed sufficient to show a few manually operable electro-mechanical computer input switches, together with certain read out components. The control functions of the micro-processor unit MP will however be described in detail at appropriate times during the discussion of the forward movement of the rails R along the table 24, the feeding of the clips to the tool 30, and the application of the fed clips to the rails at the selected regions therealong.

It will be recalled from an earlier discussion that with most furniture rails, variable spacing of the clips along the rails is resorted to in accordance with the dictates of stress requirements that exist when the article for furniture is assembled. The necessity of spacing the clips closer together near the end regions of the rails than for spacing them in the medial regions thereof, and the use of different numbers of such end and medial clips have been previously set forth. A disclosure of an exemplary clip spacing pattern is shown in FIG. 11, utilizing two front end clips, four medial clips, and two rear end clips. The effecting of different clip spacing patterns for different runs of conveyor rails is capable of being accomplished by manually setting the desired clip requirements into the unit MP without necessitating any adjustments to the rail- and clip-handling mechanisms.

Accordingly, and with reference to FIG. 10, the micro-processor unit MP may be of a type which is manufactured and sold by Sterling Electric Company of Sterling, Illinois and it embodies a front panel 200 having a two-position rotary on-off power switch 202 for energizing the conveyor drive motor M, a push button switch 204 which, upon depression thereof, initiates functions that cause actuating of the clip-applying tool 30, as well as of the clip feeding mechanism 40, and a push-pull type switch 206 which may be operated to actuate the brake and clutch mechanism A series of five digital switch units indicated by the bracket designation 208 in FIG. 10 constitutes means for the feeding of information into the micro-processor for computing purposes and the resultant transmission of machine or apparatus operating control signals back from the unit MP to the apparatus. A read out indicator 210 in the upper region of the panel 200 indicates the distances between each pair of adjacent clips, the indicator automatically resetting itself to zero after each clip application.

The digital switch units 208 have been individually labelled P1, P2, P3, P4 and P5. The unit P1 through P4 are three-digit units while the unit P5 is a two-digit unit. The unit P1 is manually actuated to set into the micro-processor MP the distance (in small increments of motion such as hundredths of an inch) that a rail shall travel after sensing of its leading edge before the first clip is applied thereto. The unit P2 similarly controls the spacing of the second clip from the first clip. The unit P3 controls the spacing of the third clip from the second clip. The digits which are set into the micro-processor MP by the unit P4 controls the spacing between all of the medial clips that are to be applied. The units P2 and P3 also control the spacing of the rear end clips from each other so that it corresponds to the spacings specified for the front end clips.

Still referring to FIG. 10, in the operation of the clip-applying apparatus, upon closure of a master switch MS, power is made available from a suitable source S to the micro-processor unit MP for functioning thereof and, thereafter, upon closure of the switch 202, a circuit will extend from the unit MP through a lead 11, the motor M, and a lead 13 back to the unit MP. Energization of the motor M will become effective through the brake and clutch unit 74 to set the conveyor 67 into operation upon pulling of the switch 206. The unit 74 embodies a normally engaged clutch 220 and a normally released brake 222. Solenoid magnets CM and BM are associated with the clutch 220 and brake 222 respectively.

Upon operation of the conveyor 67, and as soon as one of the rail-impelling lugs 84 thereon engages the rear edge of the bottomost rail R at the stacking station SS, it impels the rail forwardly on the table surface 24 beneath the gate plate 62. Upon actuation of the conveyor, the encoder 86 will commence the emission of electrical impulses ant these will be forwarded to the unit MP through leads 15 and 17.

At such time as the leading edge of the thus impelled rail R encounters the sensing device 110, a signal is forwarded to the unit MP through leads 19 and 21, such signal initiating the operation of an electronic counter which commences registering the impulses which have ben emitted by the encoder 86 from the time that the leading edge of the rail encountered the sensing devie 110. Thereafter, when the predetermined number of impulses have been registered in the unit MP, the brake and clutch magnets BM and CM are caused to become energized substantially simultaneously, thus engaging the brake 222 and releasing the clutch 220. The circuit for the brake magnet BM extends from the micro-processor unit MP through a lead 23, the magnet BM and leads 25 and 27 back to the unit MP. The circuit for the clutch magnet CM extends from the unit MP through a lead 29, the magnet CM, and leads 31, 27 back to the unit MP.

Since the impulses emitted by the encoder 86 represents increments of motion of the rail R moving with the conveyor 67, the registering of impulses in the unit MP, in effect, measures the distance of travel of the rail from the instant of sensing thereof until the brake 222 is applied to stop the conveyor 67 for application of a clip thereto by the clip-applying tool 30. Ordinarily the sensing device 110 is adapted to become effective precisely at the moment that the leading edge of the rail R moves into register with the clip driver 150 so that when the brake 222 is applied, the rail will have traveled beyond the driver 150 a distance equal to the selected distance set into the digital switch P1. However, if there is any discrepancy between the vertical alignment of the sensing device and the driver, the unit MP may be designed to compensate for such discrepancy.

Immediately upon stopping of the conveyor and the rail carried thereby, a circuit is established through the winding w of the solenoid valve SV, such circuit extending through a lead 31, the winding w, and lead 33 back to the unit MP. Energization of the winding w will cause air to flow from an air supply (so labelled) through the air line 101, the valve SV, and lines 103, 105 to the cylinder 155 of the tool 30, thus actuating the driver 150 to apply the clip to the rail R at the selected distance from its leading edge. Air is exhausted from the cylinder 155 through the line 107 and valve SV to the atmosphere.

At the time that air is supplied to the cyliner proper 155 of the tool 30, air is supplied to the cylinder 159 of the clip-feeding device 40 through a line 109 connected to the line 103 to drive the plunger 161 and thus actuate the feeding device 40 in the manner previously described so as to feed a new clip into position beneath the driver 150 to replace the previously applied clip.

The micro-processor unit MP is so programmed that the circuit for the brake and clutch magnets BM and CM remain effective for a sufficient length of time to allow for proper and complete operation of the clip-applying and clip-feeding functions, with the rail remaining motionless on the momentarily disabled conveyor 67. Thereafter, upon reversal of the clutch and brake, conveyor operation and rail motion is resumed so that impulses are again emitted by the encoder 86, registered in the unit MP and, when the required number of impulses commensurate with the distance between the first applied clip and the next clip to be applied has been registered in the unit MP, as set thereinto by the digital switch P2, the clip-applying operation described above is repeated.

Further repetition of these functions takes place sequentially until the last clip has been applied, clip spacing taking place according to input functions which have been made by adjustment of the various digital switch units 208 and which take into account the close clip spacing of the groups of end clips and the wider spaced medial clips.

It is to be noted at this point that during such time as the rail R traverses the clip-applying station CS, the rail sensing device 110 is maintained effective by reason of its engagement with the underneath face of the rail so that the contacts of the switch LS remain closed. After the arm 112 is released by the trailing end of the rail, these contacts become open, thus deenergizing the circuits for the brake and clutch magnets BM and CM and allowing the conveyor to resume its movements so that, in due course, one of the impelling lugs 84 will "pick up", so to speak, the next succeeding rail to be treated from the bottom of the stack of rails at the stacking station SS. The application of clips to each succeeding rail will be carried out in the manner set forth above until all of the stacked rails have been exhausted, after which the conveyor will continue to run until the push-pull switch 206 is operated to terminate the conveyor movement.

From the above description it is believed that the nature, the functioning and the many advantages of the herein described clip-applying apparatus will be readily apparent. It is to be understood that the invention is not to be limited to the exact arrangement of parts shown in the accompanying drawings or described in this specification as various changes in the details of construction may be resorted to without departing from the spirit of the invention. For example, although the sensing device 110 illustrated herein is in the form of a mechanically operated limit switch LS, it is within the purview of the invention to utilize a photoelectric cell and a cooperating light beam. Additionally, substantially the same variations in clip-spacing along the rails may be attained by eliminating the encoder 86 and the brake and clutch mechanism 74 and employing a stepping motor having a translator associated therewith to drive the conveyor directly, and employing a micro-processor which, after the leading edge of a rail has been sensed, registers the emissions of the translator and, when the predetermined number of emissions have been registered, causes the motor and conveyor and rail carried by the latter to stop, with the pneumatic and electric circuitry remaining substantially the same as described herein. It should also be borne in mind that the apparatus is not necessarily confined to the vertical application of clips to the rails since, by suitable modification, facilities may be provided for driving the clips horizontally or at any other angle thereto. Numerous other modifications are contemplated and, therefore, only insofar as the invention has been particularly pointed out in the accompanying claims is the same to be limited.

What is claimed is:

1. In an apparatus for applying pronged anchoring clips to the edge regions of successive elongated wooden furniture rails at predetermined spaced distances therealong, in combination, a a rail-supporting table establishing a rail loading station and a clip-applying station, a clip-applying tool at said latter station effective to cause prong embedment of the clips into the rails, a conveyor effective when driven to conduct successive rails endwise along the table from the loading station to and through the clip-applying station, normally operative power actuated means for driving the conveyor, means establishing a source of clips, a clip-feeding device in the vicinity of said tool and effective when actuated to feed clip, one at a time, from the source to the tool to drive the clip prongs into the rails, a sensing device fixedly positioned along said path and effective to sense the leading edges of successive rails, an impulse-emitting device effective when actuated to emit electrical impulses in timed relation to the rate of travel of the rails along said path, means effective upon movement of the conveyor, and consequently of the rails, for actuating said impulse-emitting device and means repeatedly effective upon emission of predetermined cumulative numbers of impulses incident to sensing the leading edge of each rail for disabling said conveyor driving means to establish sequential periods of conveyor dwell and, at each dwell period, to actuate both the clip-applying tool and the clip-feeding device, whereby the clips are applied to the successive rails at predetermined spaced distances therealong.

2. The combination set forth in claim 1, wherein a rail stacking bin adapted to receive vertically stacked rails therein is disposed at the loading station, the conveyor is of the endless chain type having an upper reach which is disposed substantially at table level and which closely underlies the stacking bin, as well as the path of rail movement along the table, one or more rail-impelling lugs are carried by the conveyor chain, said lugs are effectively engageable with successive bottommost rails in the stacking bin for impelling the same forwardly along said path, and a rail-arresting gate plate defines the forward wall of the stacking bin and serves to restrain the overlying rails above the bottommost rails from traveling forwardly with such bottommost rails.

3. The combination set forth in claim 1 including, additionally, presettable means for varying the predetermined cumulative numbers of impulses which are repeatedly emitted.

4. The method of applying pronged sheet metal anchoring clips to the edge regions of successive wooden board-like furniture rails at predetermined distances therealong, said method comprising the steps of impelling successive rails endwise and longitudinally along the upper surface of a supporting table in a linear path to and through a clip-applying station and beneath a vertically movable clip driver at such station, each clip having a base portion designed for face-to-face engagement with one longitudinal edge of the rail, a lateral flange designed for face-to-face engagement with the upper surface of the rail, and at least one prong depending from said flange and adapted to be driven into the surface of the rail, slidably supporting a string of interconnected clips in a clip magazine in the vicinity of said driver, sensing the leading eadge of each rail at a predetermined fixed distance from the vertical path of movement of the clip driver as such edge approaches the clip-applying station and, upon sensing thereof, causing a series of electrical impulses to be emitted in conformity with the rate of movement of the rail on the table and successively, after the emission of predetermined numbers of impulses has been effected, terminating the movement of the rail, causing the string of clips in the magazine to advance so as to project the leading clip therein between the driver and the rail while causing the driver to descend and shear the leading clip from the magazine and press the prong thereof into the rail, and resuming the endwise impelling of the rail.

* * * * *